United States Patent [19]

Pettit

[11] Patent Number: 5,339,630
[45] Date of Patent: Aug. 23, 1994

[54] EXHAUST BURNER CATALYST PREHEATER

[75] Inventor: William H. Pettit, Rochester, N.Y.

[73] Assignee: General Motors Corporation, Detroit, Mich.

[21] Appl. No.: 936,463

[22] Filed: Aug. 28, 1992

[51] Int. Cl.⁵ .................................................. F01N 3/02
[52] U.S. Cl. ........................................ 60/303; 60/748; 431/354
[58] Field of Search ................. 60/303, 286, 737, 748; 431/354, 158

[56] References Cited

U.S. PATENT DOCUMENTS

| | | | |
|---|---|---|---|
| 2,958,195 | 11/1960 | Dooley | 60/748 |
| 3,940,253 | 2/1976 | Zetterstrom | 422/182 |
| 4,006,589 | 2/1977 | Schirmer | 60/748 |
| 4,381,643 | 5/1983 | Stark | 60/303 |
| 4,383,411 | 5/1983 | Riddel | 60/303 |
| 4,481,767 | 11/1984 | Stark | 60/303 |
| 4,502,278 | 3/1985 | Stark | 60/303 |
| 4,651,524 | 3/1987 | Brighton | 60/286 |
| 4,677,823 | 7/1987 | Hardy | 60/274 |
| 4,744,217 | 5/1988 | Goerlich et al. | 60/303 |
| 4,840,028 | 6/1989 | Kusada et al. | 60/303 |
| 4,912,920 | 4/1990 | Hirabayashi | 60/286 |
| 4,951,464 | 8/1990 | Eickhoff | 60/303 |
| 4,987,738 | 1/1991 | Lopez-Crevillen et al. | 60/286 |
| 5,063,737 | 11/1991 | Lopez-Crevillen et al. | 60/286 |
| 5,140,814 | 8/1992 | Kreutmair | 60/303 |

FOREIGN PATENT DOCUMENTS 59-100307 9/1984 Japan .

*Primary Examiner*—Douglas Hart
*Attorney, Agent, or Firm*—Karl F. Barr, Jr.

[57] ABSTRACT

A burner for heating an exhaust gas stream is disclosed having a combustor head with a fuel/air charge preparation apparatus comprising a fuel nozzle and dual vortex atomizer. The charge preparation apparatus is mounted on one side of a base member or partitioning member having an outlet through which the atomized fuel and air pass to a combustor chamber defined by a combustor tube fixed to a second side of the partition. The combustor tube has an ignitor and outlets for the burning fuel/air mixture. The outlets have flow directing louvers which function to direct the output in a predetermined direction to optimize mixing of the burner output with an exhaust gas stream. The combustor head is mounted through an opening in a housing which positions the combustor tube outlets in the exhaust stream.

3 Claims, 4 Drawing Sheets

EXHAUST BURNER CATALYST PREHEATER

BACKGROUND OF THE INVENTION

1. Field of the Invention

This invention relates to an internal combustion engine exhaust treatment apparatus and, in particular, to a fuel fired catalytic converter preheater.

2. Description of the Relevant Art

Advancement in emission technologies for internal combustion engines has resulted in significantly lowered total engine emissions. In general, automotive emissions applications employ an exhaust mounted catalytic treatment device for reducing regulated exhaust constituents such as Hydrocarbons (HC), Carbon Monoxide (CO), and Oxides of Nitrogen ($NO_x$) in the engine exhaust prior to their release to the atmosphere. The catalyst treatment devices, or catalytic converters, rely on the heat of the exhaust gas to become catalytically active following a cold start. Initiation of catalyst activity occurs at the light-off temperature and is typically in the area of 400 degrees C. A vehicle may require 75-100 seconds or more of engine operation before the exhaust supplies sufficient heat to reach catalyst light-off. Accordingly, in order to reduce cold-start emissions, it is desirable to provide an additional heat source at, or shortly after, engine start-up, which will promote faster heating of the converter and, therefore, a shorter time to optimal catalyst efficiency.

Several technologies have been considered for the preheating of catalytic converters. Electrically heated converters, which use an engine driven electrical system to heat elements in the converter, or the catalyst support itself, in the case of metal supports, have been proposed. The heat output of the electrically heated units is directly related to the electrical input. In order to achieve the desired, rapid heating of the catalyst support, significant power must be supplied by the electrical system.

Burner systems, to which the present invention is directed, have also been considered for achieving rapid heating. Although not suffering from the drawbacks of electrically heated units, such systems require a burner, a fuel system, and an ignition system along with the related complexity and packaging problems associated with such systems. In addition, rapid, reliable ignition of the burner, burner control, and adequate mixing of the burner output with the engine exhaust have been problematic.

SUMMARY OF THE INVENTION

Accordingly, an object of the present invention is to provide a simplified burner design which is capable of integration into the vehicle fuel and powertrain systems thereby reducing cost and complexity and increasing reliability.

Another object of the present invention is to provide a burner having unique fuel charge preparation which assures complete fuel atomization and efficient combustion.

A further object of the present invention is to provide a burner having a unique combustor design capable of reliable and efficient operation regardless of location in the exhaust gas stream and under a wide range of fuel and air supply conditions.

The burner comprises a combustor head assembly having a means for mixing fuel and air, and a source of ignition for the fuel/air mixture. A charge preparation assembly within the combustor head comprises a two-stage vortex, which cooperates with a fuel nozzle, to atomize the fuel and combine it with combustion air to produce a fuel/air mist. The fuel/air mist is subsequently injected into a combustor comprising an elongated tubular combustor chamber having the combustor head at a first end and a series of outlets at the second, or opposite end. The outlets of the combustor are placed circumferentially about the outer periphery of the tubular combustor with louvers at the openings to direct burner output in a predetermined direction to optimize mixing with exhaust gas passing through the burner.

The combustor is mounted within a burner housing. An interlocking flange assembly retains the combustor and the burner housing together as one unit. Exhaust gas enters the housing through an inlet adjacent to the combustor outlets such that exhaust gas entering the burner housing passes over the exterior of the combustor and past the louvered outlets to maximize heat retrieval. Dilution air, which may be required to complete combustion of the burner fuel and to assure maximum conversion efficiencies in the catalytic converter during the initial phase of engine operation, is added to the exhaust gas stream at a location upstream of the combustor so as to encourage mixing of the dilution air with the exhaust gas prior to heating by the burner.

The burner assembly is operably connected to a catalytic converter with the exit from the burner preferably lying in close or adjacent proximity to the inlet of the converter. Such a configuration reduces the size of the assembly and limits the loss of heat between the burner and the converter.

Other objects and features of the invention will become apparent by reference to the following description and to the drawings.

DESCRIPTION OF THE PREFERRED EMBODIMENT

Figure 1:
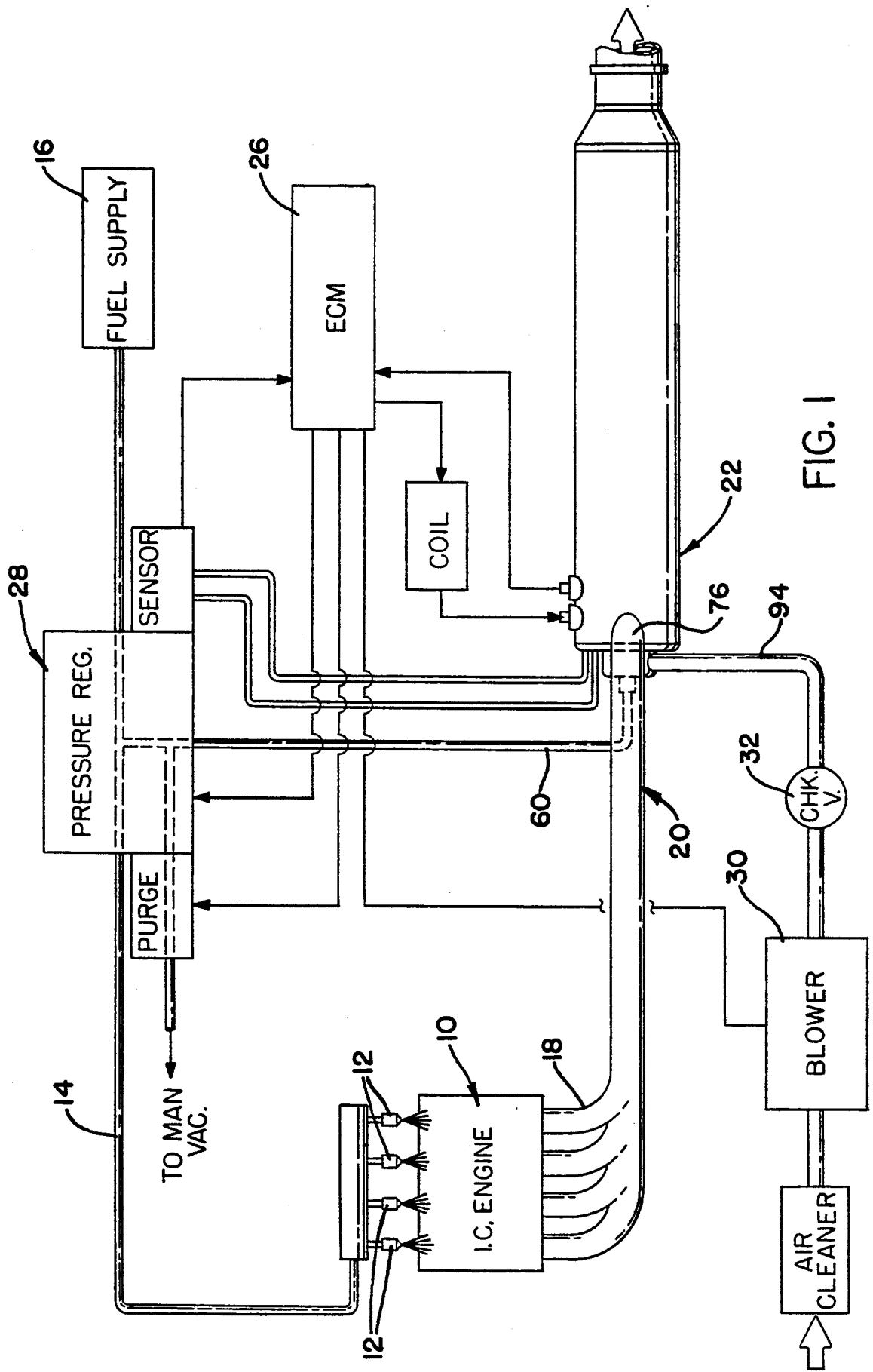
FIG. 1 is a schematic view of an internal combustion engine system embodying the present invention.

FIG. 1 schematically illustrates a typical automotive installation of the present invention. An internal combustion engine system comprises an engine 10 having a fuel system which includes a means for delivery of fuel to the engine such as injectors 12, a fuel line 14 for delivery of fuel to the injectors 12, and a source such as a fuel tank 16 from which pressurized fuel is obtained. Fuel and air are combusted in the engine 10 and are exhausted through manifold 18 to an exhaust system, designated generally as 20.

Figure 2:
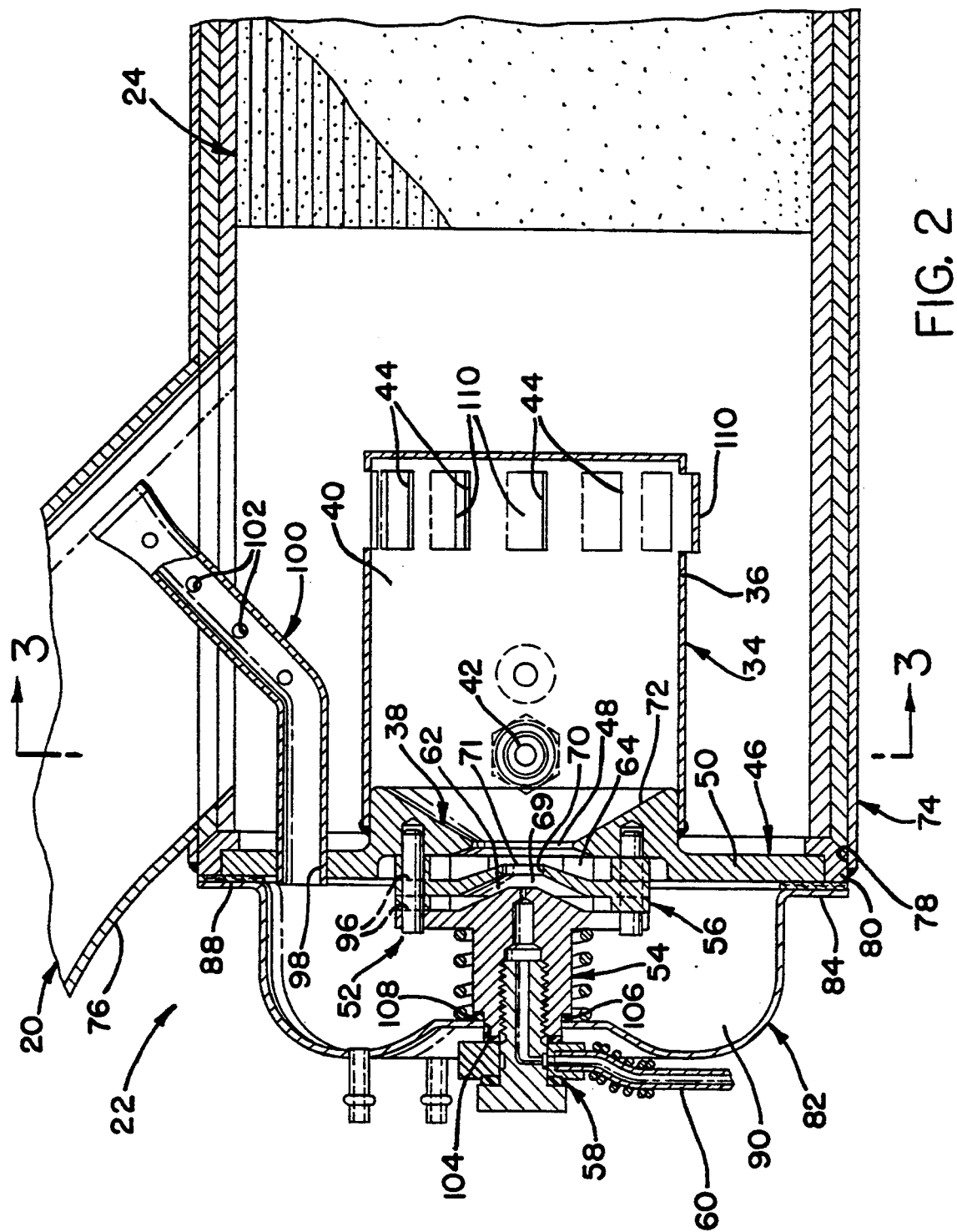
FIG. 2 is a sectional side view of the exhaust burner catalyst preheater of the present invention.

The exhaust system 20 comprises a burner assembly 22 and a catalytic converter 24, see FIG. 2. The converter 24, which operates to reduce the level of undesirable exhaust constituents which exit the exhaust system, must be operated above a particular temperature, referred to as the light-off temperature, to achieve optimal performance. In order to reduce the time required for the converter 24 to reach the light-off temperature, the burner 22 is located so that its output is mixed with the exhaust gas upstream thereof. The burner 22 is operated for a short time following engine start-up to heat the exhaust gas thereby contributing to the heat available in the exhaust gas which is available to heat the converter 24.

An electronic controller 26 controls fuel and air supplied to the burner by fuel metering assembly 28 and blower or air pump 30, respectively. Fuel meter 28 regulates fuel from supply 16 to a desired pressure and flow rate which is consistent with the goals of the burner control strategy. The fuel meter 28 may be a pulse-width modulated injector or electronic fuel regulator capable of continually modulating fuel supply to a predetermined input duty cycle. A preferred embodiment of such a metering device is described in application U.S. Ser. No. 07/909,488 filed Jul. 6, 1992, and assigned to the assignee of the present application. Similarly, combustion air is supplied to the burner 22 via an engine driven or electrical air pump 30. The air supply is regulated to a predetermined pressure, also consistent with burner control strategy. A check valve 32, disposed between the burner 22 and the blower 30, provides protection to the blower from exhaust gas during periods of inoperation.

Figure 3:
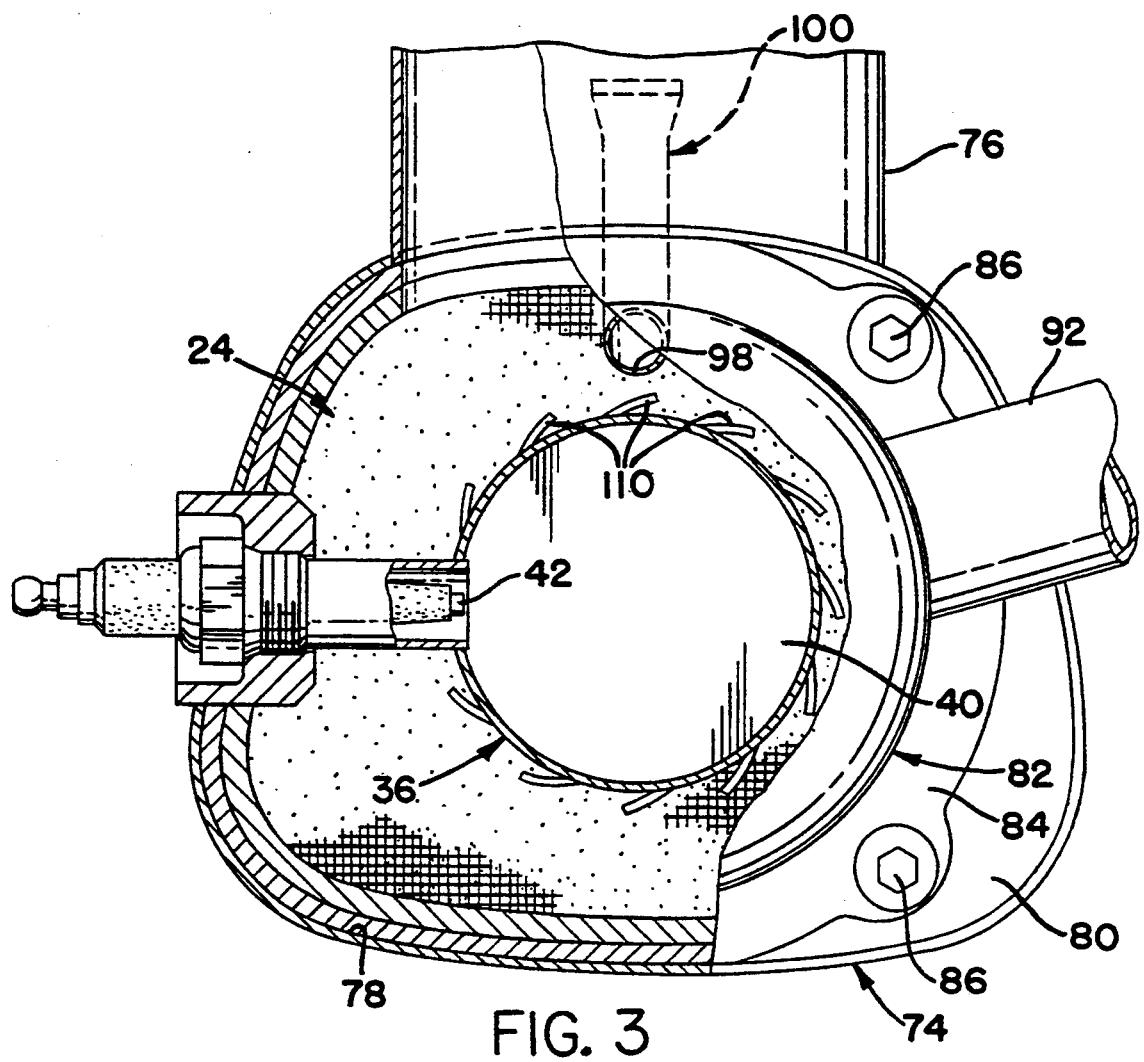
FIG. 3 is a sectional view of the exhaust burner catalyst preheater of FIG. 2, taken along line 3—3 of FIG. 2.
Figure 4:
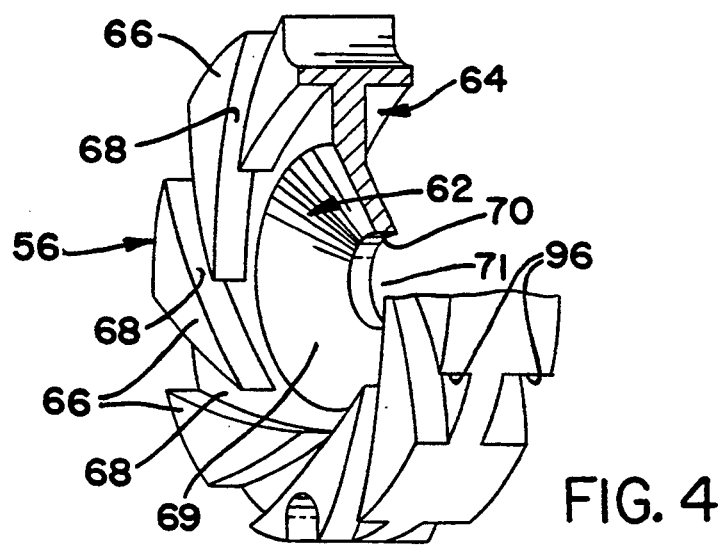
FIG. 4 is a perspective view, partially in section, of a two-stage vortex embodied in the present invention.

Referring to FIGS. 2 through 4, burner assembly 22 comprises a primary combustor assembly 34. A principle component of the primary combustor assembly 34 is combustor tube 36, an axially extending tube having a combustor head 38 located at a first end, a combustion chamber 40 with ignition means 42, and a series of burner outlets 44 located at the second end thereof. The combustor head 38 includes a base member 46, fixed to, and closing the first end of combustor tube 36. The base member has a throughbore 48 which opens into the combustion chamber 40, and a flange member 50 extending outwardly from the primary combustor tube 36 about the perimeter of the base member.

A charge preparation assembly 52 is mounted to one side of the base member 46 and comprises a fuel nozzle 54 which receives fuel from supply 16 and a two-stage vortex 56, see FIG. 4, which mixes fuel from nozzle 54 with pressurized air from air pump 30 to create a fuel-/air fog or mist which is subsequently supplied to the primary combustor tube 36 by way of throughbore 48, for ignition and burning therein. The fuel nozzle 54 may comprise any of a number of designs which are well known in the art such as a fuel filming nozzle which utilizes fuel system pressure to aid in fuel atomization. Such a nozzle configuration is desirable for its robust design which allows reliable burner operation under a wide range of fuel and air flows and combustor backpressure. The nozzle 54 has a connector, such as banjo fitting 58, in communication with fuel line 60 from fuel meter 28, and is mounted to vortex 56 so that its discharge end injects pressurized fuel into the first stage 62 of the two-stage vortex 56.

As illustrated in FIG. 4, the two-stage vortex has first and second stages 62, 64, respectively. Each stage comprises a set of vanes or directors 66 which define orifices 68 therebetween. Pressurized air is supplied at the outer perimeter of the vortex and passes between vanes 66 to exit orifices 68 at the center of the vortex where it mixes with and atomizes fuel from the nozzle 54, in a vortex chamber 69 defined by orifices 68, with a high degree of tangential velocity and swirling effect. The vortex shape, area, and number of vanes define the pressure drop across orifices 68, the velocity of the exiting air swirl and the flow rate of air through the primary combustor assembly 34. The second vortex stage 64 may differ from the first principally in the flow area and direction of the vanes and therefore the direction and velocity of the air entering the combustor. In operation, the first stage 62 of vortex 56 atomizes the fuel particles from the nozzle 54 and sends the fuel/air mixture through the opening 70 and into vortex chamber 71 of second stage 64 with a high degree of tangential velocity. The second stage 64 further atomizes the fuel/air mixture to produce a fog or mist of high tangential velocity which spreads rapidly into the combustor chamber 40 following the contour of the base member 46. The base member may have an integral, angled director 72 to impart an axial direction to the radially outwardly moving fuel/air fog.

An ignitor such as spark plug 42 initiates combustion of the fuel/air fog moving axially through the combustor tube 36. Upon reaching the end of the combustor tube opposite the base member 46, the burning fuel/air mixture, or burner output exits the combustor tube through a series of outlets 44 spaced circumferentially about the side of the tube 36.

The primary combustor assembly 34 is mounted within an outer shell, or burner housing 74, to form a burner assembly 22 which can be mounted integrally within the exhaust system 20 of engine 10. The burner housing 74 is of a suitable configuration for support of the primary combustor assembly 34 in a substantially coaxial orientation therein. In the preferred embodiment illustrated in FIGS. 1 through 3, the housing is configured with an inlet conduit 76 for conducting exhaust gas from engine 10 into the assembly, an opening 78 for the mounting of the combustor assembly 34 located at the base, or exit end of the inlet conduit 76, and an outlet configured to be mounted in operable communication with a catalytic converter 24. The opening 78 has a mounting flange 80 extending about the perimeter thereof which is configured to cooperate with the flange 50 of base member 46 to support the combustor assembly 34 within burner housing 74. An air distribution housing 82 has a mating surface or retaining flange 84 which is configured to sealingly engage burner housing flange 80 and combustor base flange 50 to rigidly support the individual components relative to one another. Fastening means such as bolts 86 may be used to assemble the components and sealing means such as gasket 88 assure a leaktight seal at the component interfaces.

The supply of combustion air to the two-stage vortex 56 and the supply of reaction air to the exhaust gas is through the air supply housing 82. Once in place the air supply housing 82 defines an air chamber 90 which receives a supply of pressurized air through inlet 92 which is connected to air pump 30 through air conduit 94, see FIG. 1. From chamber 90 combustion air enters vortex 56 through the vortex openings 96, as described above. Reaction air passes through an opening 98 in the base member 46 and into a distribution tube or manifold 100 which is fixedly attached to the base member and extends into the exhaust gas flow in inlet tube 76. A series of reaction air outlets 102 assures distribution of the air in the exhaust gas stream.

An opening 104 in the air distribution housing facilitates the attachment of the fuel supply to the fuel nozzle 54. In order to minimize the likelihood of air leakage out of the housing through the opening, the housing is configured to seat against a shoulder 108 on the nozzle body 54. A sealing member, such as copper crush washer 106, may be placed between the air housing 82 and the shoulder 108 to assure a sealing interface.

Figure 5:
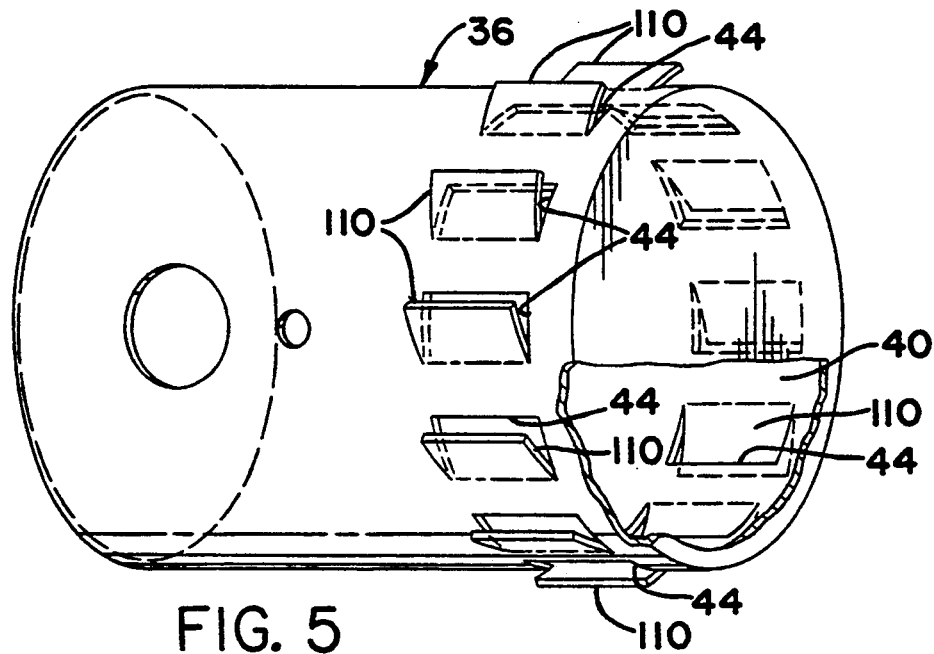
FIG. 5 is a perspective view, partially in section, of a combustor tube embodied in the present invention.

Exhaust from the engine 10 is conducted into the burner housing 74 through inlet 76 where it is combined with reaction air as it passes reaction air manifold 100 and mixes with the burner output as it passes the outlets 44 of combustor tube 36. To optimize the benefits of the burner 22, relative to converter light-off time, effective mixing of the burner output with the exhaust gas must be assured. The outlets 44 of the combustor tube 36 utilize louvers 110, FIG. 5, to direct the burner output to promote thorough mixing of the two components. The louvers 110 are individually adjustable, if required, to allow for flow optimization when the combustor assembly 34 is utilized in burner housings of varying configuration.

Figure 6:
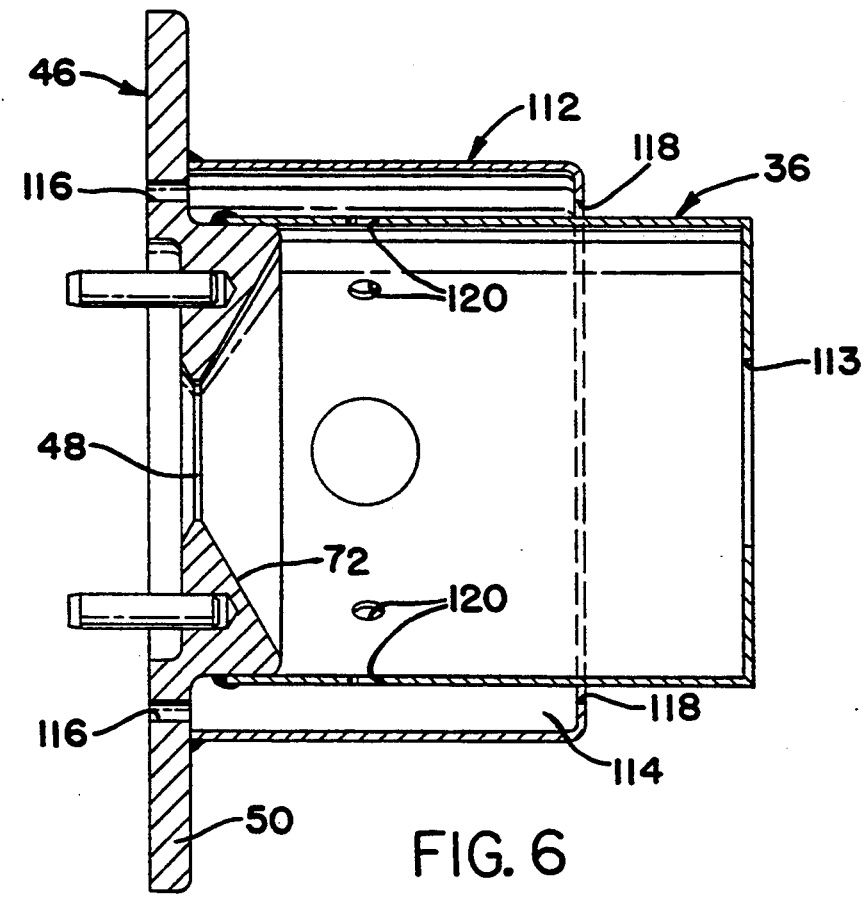
FIG. 6 is a sectional side view of a second embodiment of the combustor tube, and related components, embodied in the present invention.

In certain instances, it may be desirable to remove heat from the combustor tube at a higher rate than is possible by the flow of exhaust gas over the exterior thereof. In FIG. 6, a second embodiment of the combustor tube of the present invention is illustrated. In the Figure, like numerals are used to represent like features described in the above description. A cooling sleeve 112 has a cylindrical configuration with a diameter slightly larger than that of the combustor tube 36. A second embodiment of the combustor tube having a single outlet 113 is also shown in FIG. 6, although cooling sleeve 112 is applicable to any combustor tube configuration requiring additional cooling. The sleeve 112 attaches to the base member 46 and extends around the combustor tube defining a space 114 therebetween. Air inlets 116, comprising through-bores in the combustor base 46, dispense a portion of the combustion/reaction air to the space 114 to cool the outer surface of the combustor tube 36. A small outlet gap 118 between the inwardly turned end of the sleeve 112 and the combustion tube 36 allows the cooling air to escape from the space 114 to mix with the exhaust gas stream, carrying heat removed from the combustor to mix with the exhaust gas. Should it be desirable to add a portion of the combustion air to the fuel/air mixture within the combustor tube following initiation of the combustion event, additional combustion air inlets 120 may extend through the combustor tube 36 to direct a portion of the cooling air from the space 114 to the combustor tube.

The catalytic converter preheater of the present invention provides an efficient, burner based preheating system which provides reliable ignition and through mixing of the burner output with the engine exhaust upstream of the converter, in a compact package.

The present invention discloses a preheater having a unique burner configuration which assures maximum combustor heat transfer to the exhaust flow stream. The combustor has a simplified flange arrangement for mounting coaxially within the burner housing. In addition, fuel/air charge preparation in the combustor is handled by a two-stage vortex which produces a highly atomized fuel mist for efficient combustion in the combustor chamber.

The disclosed burner utilizes burner outlet louvers to direct the output in a desired direction, assuring optimal mixing of the output with the engine exhaust.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. A burner for heating an exhaust gas stream comprising a combustor head having a fuel/air charge preparation apparatus and a combustion chamber separated by a partition and operably connected through an opening in said partition, said charge preparation apparatus having means for the introduction of fuel and air and a dual vortex fuel/air mixing apparatus comprising a first vortex adjacent to and in communication with said fuel means having a series of vanes extending from the outer perimeter of said vortex to establish a series of orifices defining a centrally located vortex chamber, said series of vanes operable to direct pressurized air, from said air source through said series of orifices and into said vortex chamber to induce atomization of fuel introduced into said chamber by said fuel means, and a second vortex chamber, communicating with said first chamber through an opening extending therebetween and through which atomized fuel and air pass, said second vortex chamber having a series of vanes extending from the outer perimeter of said vortex to establish a series of orifices defining a centrally located vortex chamber, said series of vanes operable to direct pressurized air, from said air source through said series of orifices and into said vortex chamber to impart additional atomizing action to said fuel and air entering from said first vortex chamber through said opening, said second vortex chamber opening into said combustion chamber through said opening in said partition wherein said atomized fuel and air enter said combustion chamber, and ignition means in said combustion chamber operable to ignite said fuel and air entering said chamber through said opening in said partition, said combustion chamber having an outlet in communication with said exhaust stream for directing said burning fuel and air to mix therewith, said burner further comprising a burner housing having an exhaust gas inlet and outlet, and an opening located intermediate thereof, said opening having a mounting flange extending about the perimeter thereof, a corresponding mounting flange extending about said partition and engageable with said burner housing mounting flange to support said combustor head within said housing, and a burner air supply housing configured to sealingly cover said fuel/air charge preparation apparatus for supply of air to said first and second vortex, and to said exhaust gas stream, said air supply housing having a sealing flange extending thereabout and configured to engage said burner housing mounting flange and said partition mounting flange to fix said combustor head and said burner housing relative to one another, said burner further comprising a dilution air manifold extending into said exhaust gas stream and having a series of openings for release of dilution air into said stream, said dilution air manifold having an inlet end in communication with a through-hole in said partition mounting flange to facilitate the flow of air from said air supply housing to said manifold.

2. A burner for heating an exhaust gas stream comprising a combustor head having means for the introduction of fuel and air thereto, a combustor chamber defined by an elongated tubular member having a first end in communication with said fuel and air means, a combustion chamber having ignition means operable to ignite said fuel and air, and a second end having a series of outlets configured to direct burner output from said combusted fuel and air out of said combustor tube, said outlets having flow directing louvers operable to impart a predetermined flow direction to said burner output.

3. A burner for heating an exhaust gas stream comprising a combustor head having means for the introduction of fuel and air thereto, a combustor chamber defined by an elongated tubular member having a first end in communication with said fuel and air means, a combustion chamber having ignition means operable to ignite said fuel and air, and a second end having a series of outlets configured to direct burner output from said combusted fuel and air out of said combustor tube, said outlets having flow directing louvers operable to impart a predetermined flow direction to said burner output, said burner further comprising a housing having an exhaust gas inlet and outlet, and an opening located intermediate thereof, said opening having means for mounting said combustor head within said housing.

* * * * *